United States Patent
Kurita et al.

(10) Patent No.: US 8,817,660 B2
(45) Date of Patent: Aug. 26, 2014

(54) COMMUNICATION MANAGEMENT APPARATUS, COMMUNICATION MANAGEMENT METHOD, AND COMPUTER PRODUCT

(75) Inventors: Toshihiko Kurita, Kawasaki (JP); Hideki Mitsunobu, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 743 days.

(21) Appl. No.: 13/022,701

(22) Filed: Feb. 8, 2011

(65) Prior Publication Data

US 2011/0205890 A1 Aug. 25, 2011

(30) Foreign Application Priority Data

Feb. 23, 2010 (JP) .................... 2010-037806

(51) Int. Cl.
*H04L 12/28* (2006.01)
*H04L 12/56* (2006.01)
*H04L 12/24* (2006.01)

(52) U.S. Cl.
CPC ............ *H04L 41/083* (2013.01); *H04L 45/122* (2013.01)
USPC ........................... 370/254; 370/351; 709/242

(58) Field of Classification Search
None
See application file for complete search history.

(56) References Cited

U.S. PATENT DOCUMENTS

| 5,317,310 A | * | 5/1994 | Bowdon ..................... 340/2.22 |
| 6,775,288 B1 | * | 8/2004 | Tooker et al. .............. 370/395.2 |

FOREIGN PATENT DOCUMENTS

| JP | 64-011492 | 1/1989 |
| JP | 03-046432 | 2/1991 |
| JP | 11-503881 A | 3/1999 |
| WO | WO-95/25393 | 9/1995 |

* cited by examiner

*Primary Examiner* — Alex Skripnikov
(74) *Attorney, Agent, or Firm* — Fujitsu Patent Center

(57) ABSTRACT

An allocation unit allocates a path formed by combining a link between nodes to any one of a plurality of time slots. A slot rearrangement unit rearranges the plurality of time slots so that time slots to which a path is allocated by the allocation unit are consecutively arranged. A path rearrangement unit converts a path allocated to any one time slot rearranged by the slot rearrangement unit to a path formed by combining a link included in a path allocated to a time slot different from the time slot. A transmission unit transmits information of the path obtained by conversion performed by the path rearrangement unit.

9 Claims, 13 Drawing Sheets

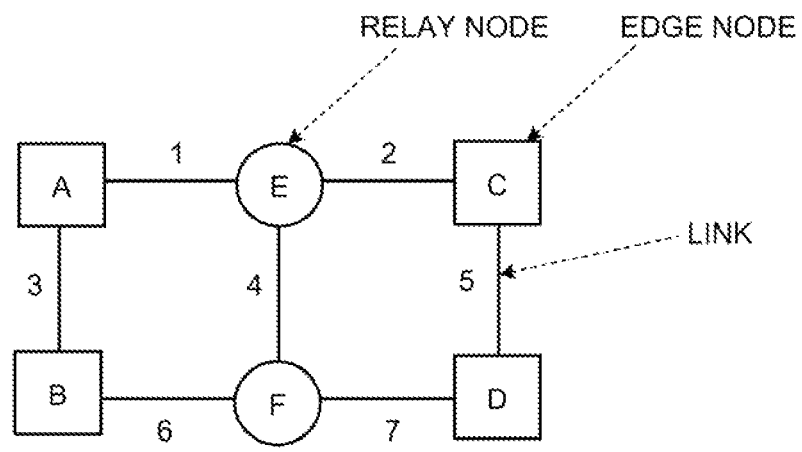

FIG.10
(AFTER PATH ALLOCATION)
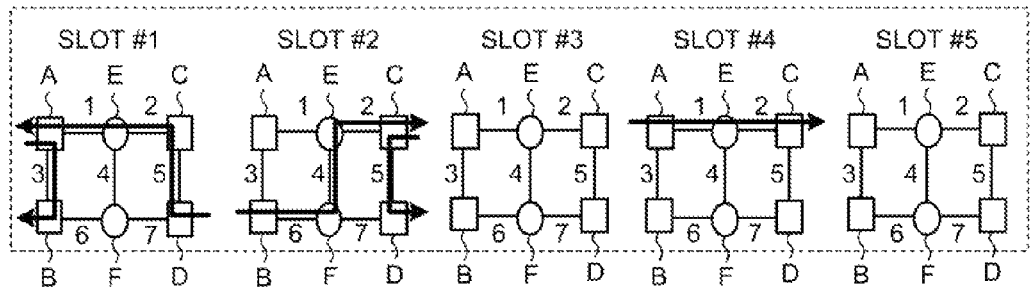
(AFTER SLOT REARRANGEMENT)
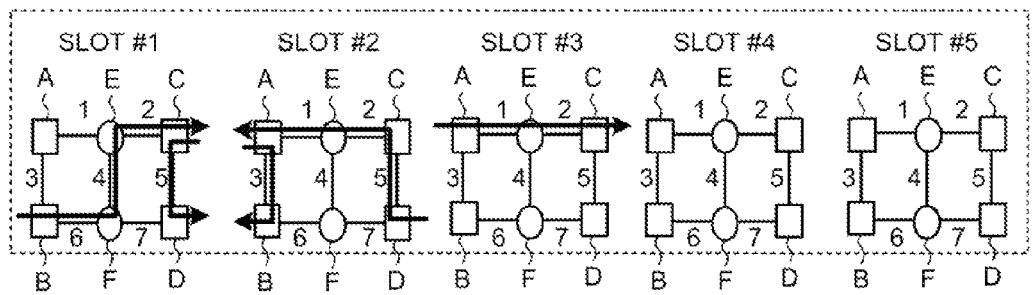
(AFTER PATH REARRANGEMENT)
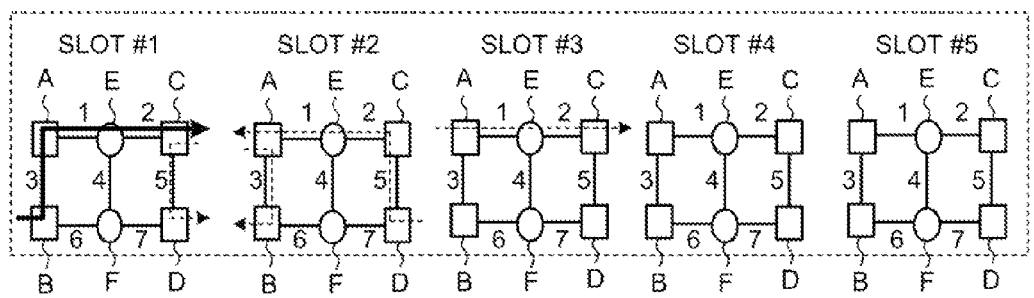

FIG.13
(AFTER PATH ALLOCATION)
| SLOT / LINK | #1 | #2 | #3 | #4 | #5 | LINK FREQUENCY |
|---|---|---|---|---|---|---|
| 1 | 1 | 0 | 0 | 1 | 0 | 2 |
| 2 | 1 | 1 | 0 | 1 | 0 | 3 |
| 3 | 1 | 0 | 0 | 0 | 0 | 1 |
| 4 | 0 | 1 | 0 | 0 | 0 | 1 |
| 5 | 1 | 1 | 0 | 0 | 0 | 2 |
| 6 | 0 | 1 | 0 | 0 | 0 | 1 |
| 7 | 0 | 0 | 0 | 0 | 0 | 0 |
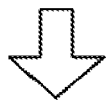
(AFTER SLOT REARRANGEMENT)
| SLOT / LINK | #1 | #2 | #3 | #4 | #5 | LINK FREQUENCY |
|---|---|---|---|---|---|---|
| 1 | 0 | 1 | 1 | 0 | 0 | 2 |
| 2 | 1 | 1 | 1 | 0 | 0 | 3 |
| 3 | 0 | 1 | 0 | 0 | 0 | 1 |
| 4 | 1 | 0 | 0 | 0 | 0 | 1 |
| 5 | 1 | 1 | 0 | 0 | 0 | 2 |
| 6 | (1) | 0 | 0 | 0 | 0 | 1 |
| 7 | 0 | 0 | 0 | 0 | 0 | 0 |
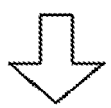
(AFTER PATH REARRANGEMENT)
| SLOT / LINK | #1 | #2 | #3 | #4 | #5 | LINK FREQUENCY |
|---|---|---|---|---|---|---|
| 1 | 1 | 1 | 1 | 0 | 0 | 3 |
| 2 | 1 | 1 | 1 | 0 | 0 | 3 |
| 3 | 1 | 1 | 0 | 0 | 0 | 2 |
| 4 | 0 | 0 | 0 | 0 | 0 | 0 |
| 5 | 1 | 1 | 0 | 0 | 0 | 2 |
| 6 | 0 | 0 | 0 | 0 | 0 | 0 |
| 7 | 0 | 0 | 0 | 0 | 0 | 0 |
RANGE IN WHICH CONSECUTIVE DORMANCY CAN BE PERFORMED

COMMUNICATION MANAGEMENT APPARATUS, COMMUNICATION MANAGEMENT METHOD, AND COMPUTER PRODUCT

CROSS-REFERENCE TO RELATED APPLICATION

This application is based upon and claims the benefit of priority of the prior Japanese Patent Application No. 2010-037806, filed on Feb. 23, 2010, the entire contents of which are incorporated herein by reference.

FIELD

The embodiments discussed herein are directed to a communication management apparatus, a communication management method, and a computer product.

BACKGROUND conventionally, as the volume of traffic flowing through a network increases, power consumption of the entire network increases. The volume of traffic flowing into the network is expected to increase greatly, and thus it is required to reduce power consumption. Particularly, since an increase in power consumption of a router is large, it is required to reduce power consumption of the router.

As a technique of reducing power consumption, clock gating has been known. The clock gating is one of low power consumption techniques of hardware. In the clock gating, in order to reduce power consumption, a clock is not supplied to a circuit that does not need to operate, and transition of a signal is stopped. For example, the clock gating may be applied to the router in the network. In this case, the router that does not perform packet transmission enters a dormant state, thereby reducing power consumption.

Examples of the related art includes Japanese Laid-open Patent Publication No. 01-011492, Japanese Laid-open Patent Publication No. 03-046432, and Japanese Laid-open Patent Publication No. 11-503881

However, in the above-mentioned conventional technique, transition between the start state and the dormant state is frequently performed. Thus, there is a problem in that power consumption required when starting and stopping the apparatus increases. Specifically, in the present network, in order to avoid quality deterioration, the routing process is performed to disperse and transmit the traffic on the network.

Thus, if the clock gating is applied to the router on the network, since traffic transmission is frequently executed, transition between the start state and the dormant state is executed with a high frequency. As a result, power consumption required when starting and stopping the apparatus increases.

SUMMARY

According to an aspect of an embodiment of the invention, a communication management apparatus includes an allocation unit that allocates a path formed by combining a link between nodes to a time slot of a plurality of time slots, a slot rearrangement unit that rearranges the plurality of time slots so that a plurality of time slots to which a path is allocated by the allocation unit are consecutively arranged, a path rearrangement unit that converts a path allocated to a time slot in the time slots rearranged by the slot rearrangement unit to a path formed by combining a link included in a path allocated to other time slot in the time slots rearranged, and a transmission unit that transmits information about the path obtained by a conversion performed by the path rearrangement unit.

According to another aspect of an embodiment of the invention, a communication management method includes allocating a path formed by combining a link between nodes to a time slot of a plurality of time slots, rearranging the plurality of time slots so that a plurality of time slots to which a path is allocated at the allocating are consecutively arranged, converting a path allocated to a time slot in the time slots rearranged at the rearranging to a path formed by combining a link included in a path allocated to other time slot in the time slots rearranged, and transmitting information about the path obtained by conversion performed at the converting.

According to still another aspect of an embodiment of the invention, a non-transitory computer-readable recording medium stores therein a computer program causing a computer to execute a process comprising, allocating a path formed by combining a link between nodes to a time slot of a plurality of time slots, rearranging the plurality of time slots so that a plurality of time slots to which a path is allocated at the allocating are consecutively arranged, converting a path allocated to a time slot in the time slots rearranged at the rearranging to a path formed by combining a link included in a path allocated to other time slot in the time slots rearranged, and transmitting information about the path obtained by conversion performed at the converting.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 8 is a diagram for explaining a network configuration storage unit;

FIG. 9 is a diagram for explaining a link use storage unit;

FIG. 10 is a diagram for explaining a slot rearrangement unit and a path rearrangement unit;

FIG. 13 is a diagram for explaining an example of a slot adjustment process performed by a management server according to the second embodiment;

DESCRIPTION OF EMBODIMENTS

Preferred embodiments of the present invention will be explained with reference to accompanying drawings. A communication management apparatus, a communication management method, and a communication management program according to the present invention are not limited to the following embodiments.

[a] First Embodiment

Figure 1:
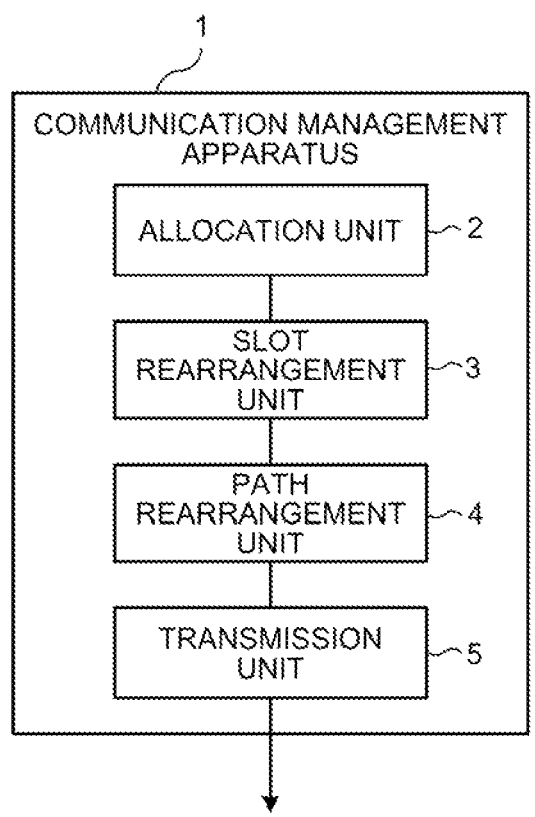
FIG. 1 is a diagram for explaining a configuration of a communication management apparatus according to a first embodiment.

First, a configuration of a communication management apparatus according to the present embodiment will be described. FIG. 1 is a diagram for explaining a configuration of a communication management apparatus according to a first embodiment. As illustrated in FIG. 1, a communication management apparatus 1 includes an allocation unit 2, a slot rearrangement unit 3, a path rearrangement unit 4, and a transmission unit 5, and allocates a path of a network to a time slot.

The allocation unit 2 allocates a data path formed by combining links between nodes to any one of a plurality of time slots. The slot rearrangement unit 3 rearranges a plurality of time slots so that the time slots to which a path is allocated by the allocation unit 2 may be consecutively arranged.

The path rearrangement unit 4 converts a path allocated to any one time slot rearranged by the slot rearrangement unit 3 to a path formed by combining links included in a path allocated to a time slot different from the time slot. The transmission unit 5 transmits information about a path obtained by conversion performed by the path rearrangement unit 4. Here, the path refers to a transmission path of data.

As described above, the communication management apparatus 1 according to the first embodiment consecutively arranges the time slots to which the path is allocated and converts any one path to a path formed by combining a link included in another path. Thus, by continuously maintaining the operation state of the node of the network, the communication management apparatus 1 according to the first embodiment inhibits transition between the operation state and the dormant state of the node, thereby reducing power consumption.

[b] Second Embodiment

Figure 2:
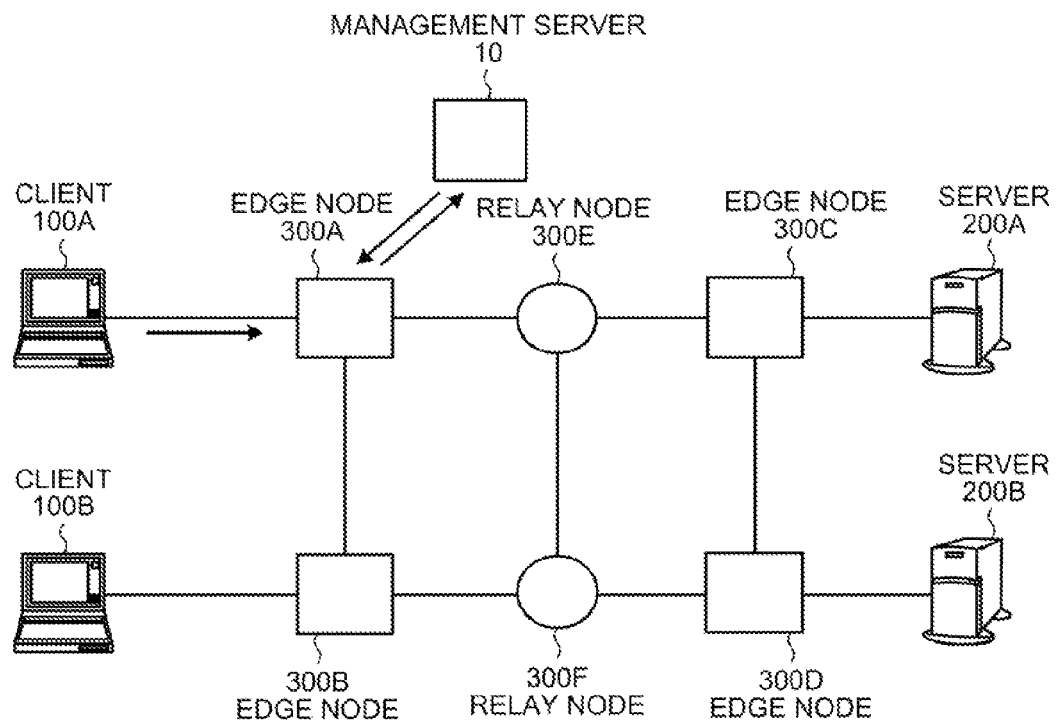
FIG. 2 is a diagram for explaining an example of a communication system including a management server according to a second embodiment.

A second embodiment will be described in connection with a case in which a management server is used as a communication management apparatus. In the second embodiment, a communication system including the management server will be first described, and then the management server according to the second embodiment will be described. FIG. 2 is a diagram for explaining an example of a communication system including a management server 10 according to the second embodiment.

As illustrated in FIG. 2, the communication system employing the management server according to the second embodiment includes a client 100A, a client 100B, a server 200A, a server 200B, an edge node 300A, an edge node 300B, and an edge node 300C. Further, as illustrated in FIG. 2, the communication system employing the management server according to the second embodiment includes an edge node 300D, a relay node 300E, a relay node 300F, and the management server 10.

As illustrated in FIG. 2, the client 100A is connected with the edge node 300A, and the client 100B is connected with the edge node 300B. The server 200A is connected with the edge node 300C, and the server 200B is connected with the edge node 300D.

Further, as illustrated in FIG. 2, the relay node 300E is connected with the edge node 300A, the edge node 300C, and the relay node 300F. The relay node 300F is connected with the edge node 300B, the edge node 300D, and the relay node 300E. The management server 10 is connected with the edge node 300A. In FIG. 2, the four edges nodes and the two relay nodes are illustrated, but the present invention is not limited thereto. For example, five or more edge nodes and two or more relay nodes may be disposed. Further, one client or server is connected to each edge node, but a plurality of clients or servers may actually be connected with each edge node.

The client 100A and the client 100B transmit or receive a data packet to or from the server 200A or the server 200B based on various requests from a user. The server 200A and the server 200B transmit the data packet based on the user's request to the client 100A or the client 100B, respectively, as a response to the data packet received from the client 100A or the client 100B.

The edge nodes 300A, 300B, 300C, and 300D transmit the data packet, which is received from the client or the server connected to themselves, to nodes that are transmission destinations, respectively. For example, when the edge node 300A receives a data packet whose transmission destination is the server 200B from the client 100A, the edge node 300A transmits the received data packet to the edge node 300D. Further, when the edge nodes 300A, 300B, 300C, and 300D receive the data packet whose transmission destination is the client or server connected to themselves from the relay node, the edge nodes 300A, 300B, 300C, and 300D transmit the received data packet to the transmission destinations, respectively. The relay node 300E and the relay node 300F relay the data packet received from the nodes connected to themselves.

Figure 3:
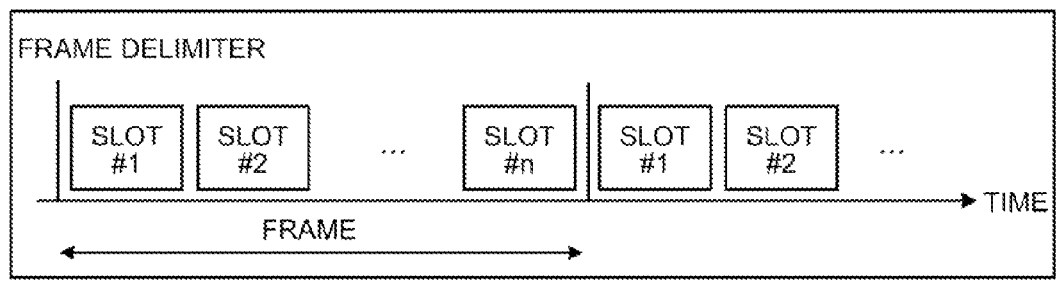
FIG. 3 is a diagram for explaining a slot.

Here, when transmitting the data packet to the node as the transmission destination, the edge nodes 300A, 300B, 300C, and 300D transmit the data packet in synchronization with time slots generated in a pseudo manner, respectively. Here, a slot may be used below as a time slot. FIG. 3 is a diagram for explaining a slot. In FIG. 3, a horizontal axis denotes a time axis. In FIG. 3, a frame delimiter that is a specific bit arrangement for recognizing a frame is illustrated at a regular interval on the time axis, and a frame delimiter interval is illustrated as one frame.

As illustrated in FIG. 3, for each one frame, n slots from a slot #1 to a slot #n are generated at a regular time interval by the edge node. Each of the edge nodes 300A, 300B, 300C, and 300D generates the same number of slots in one frame and transmits the data packet in synchronization with each of the generated slots. For example, the edge node 300A transmits the data packet in synchronization with the slot #1 when transmitting the data packet to the edge node 300D.

Figure 4:
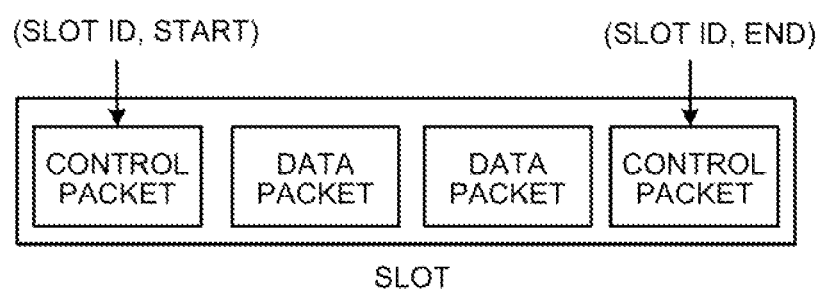
FIG. 4 is a diagram for explaining a control packet for data transmission.

FIG. 4 is a diagram for explaining a control packet for data transmission. FIG. 4 illustrates packets to be transmitted in one slot when the edge node transmits the data packet in synchronization with the slot. As illustrated in FIG. 4, the slot for data transmission includes a data packet, a slot ID, and information used for recognizing the start and end of the slot corresponding to the slot ID as a control packet. The "slot ID" is an identifier for uniquely identifying a number of the slot included in the frame.

Figure 5:
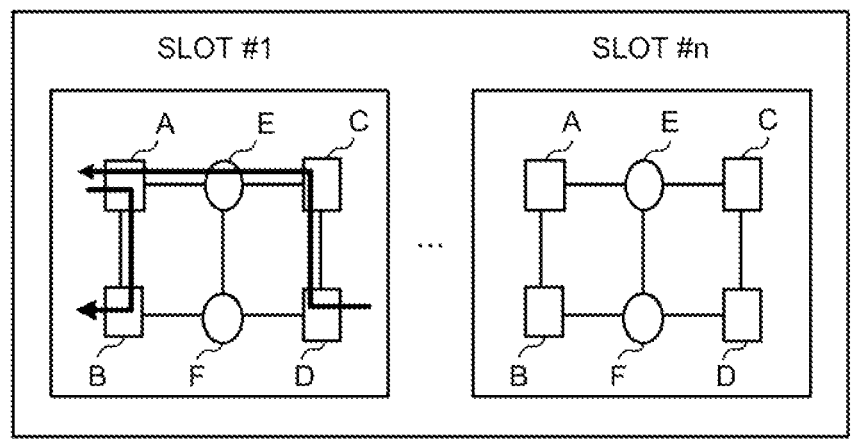
FIG. 5 is a diagram for explaining an example of allocating a path to a slot.

Here, the node, on the network, that transmits the data packet does not need to execute the routing process and the buffering process because the node transmits the data packet based on a path allocated to each slot by the management server 10, which will be described later. FIG. 5 is a diagram for explaining an example of allocating the path to the slot. In FIG. 5, a connection relationship among the edge node 300A, the edge node 300B, the edge node 300C, the edge node 300D, the relay node 300E, and the relay node 300F illustrated in FIG. 2 is illustrated in each of the slots #1 to #n.

"A," "B," "C," "D," "E," and "F" illustrated in FIGS. 5, 8, 10, 11, and 12 represent the edge node 300A, the edge node 300B, the edge node 300C, the edge node 300D, the relay node 300E, and the relay node 300F, respectively.

For example, the management server 10 which will be described later allocates, to the "slot #1," a path from the edge node 300A to the edge node 300B as illustrated in the "slot #1" of FIG. 5. Further, the management server 10 which will be described later allocates, to the "slot #1," a path from the edge node 300D to the edge node 300A as illustrated in the "slot #1" of FIG. 5. Further, the allocation of the path to the slot is performed so that a link connecting nodes is not duplicatively used in order to prevent the data packets from colliding with each other. Here, the path refers to a transmission path of data.

The node, on the network, that transmits the data packet executes switching based on the path allocated to the slot. For example, the edge node 300D transmits the data packet to the edge node 300C within the time interval of the "slot #1" illustrated in FIG. 5. Further, the edge node 300C transmits the data packet received from the edge node 300D to the relay node 300E within the time interval of the "slot #1" illustrated in FIG. 5. Further, the relay node 300E transmits the data packet received from the edge node 300C to the edge node 300A within the time interval of the "slot #1" illustrated in FIG. 5.

Each node on the network transmits the data packet based on the path allocated to the "slot #2" when the time interval of the "slot #2" is set. That is, in the entire network including all nodes, switching on the data packet to transmit is performed at a regular time interval.

Figure 6:
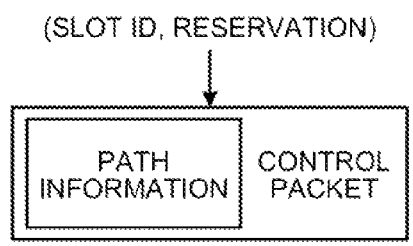
FIG. 6 is a diagram for explaining a control packet for slot reservation.

Here, slot reservation for establishing the path allocated to the slot by the management server 10 which will be described later will be described with reference to FIG. 6. FIG. 6 is a diagram for explaining a control packet for slot reservation. The edge node that received the data packet from the client or the server first transmits an allocation request for establishing the path to the management server 10 which will be described later. The edge node that received information about the path allocated from the management server 10 transmits the control packet for slot reservation to the node present on the path.

For example, as illustrated in FIG. 6, the edge node transmits, to a node present on the path, a control packet in which path information that is information about a transmission source node and a transmission destination node is added to a control packet representing a slot ID of a slot to which a path is allocated and information on slot reservation. The edge node and the relay node that received the control packet for slot reservation set a transmission destination of the data packet for each slot and establish the path based on information included in the control packet.

Figure 7:
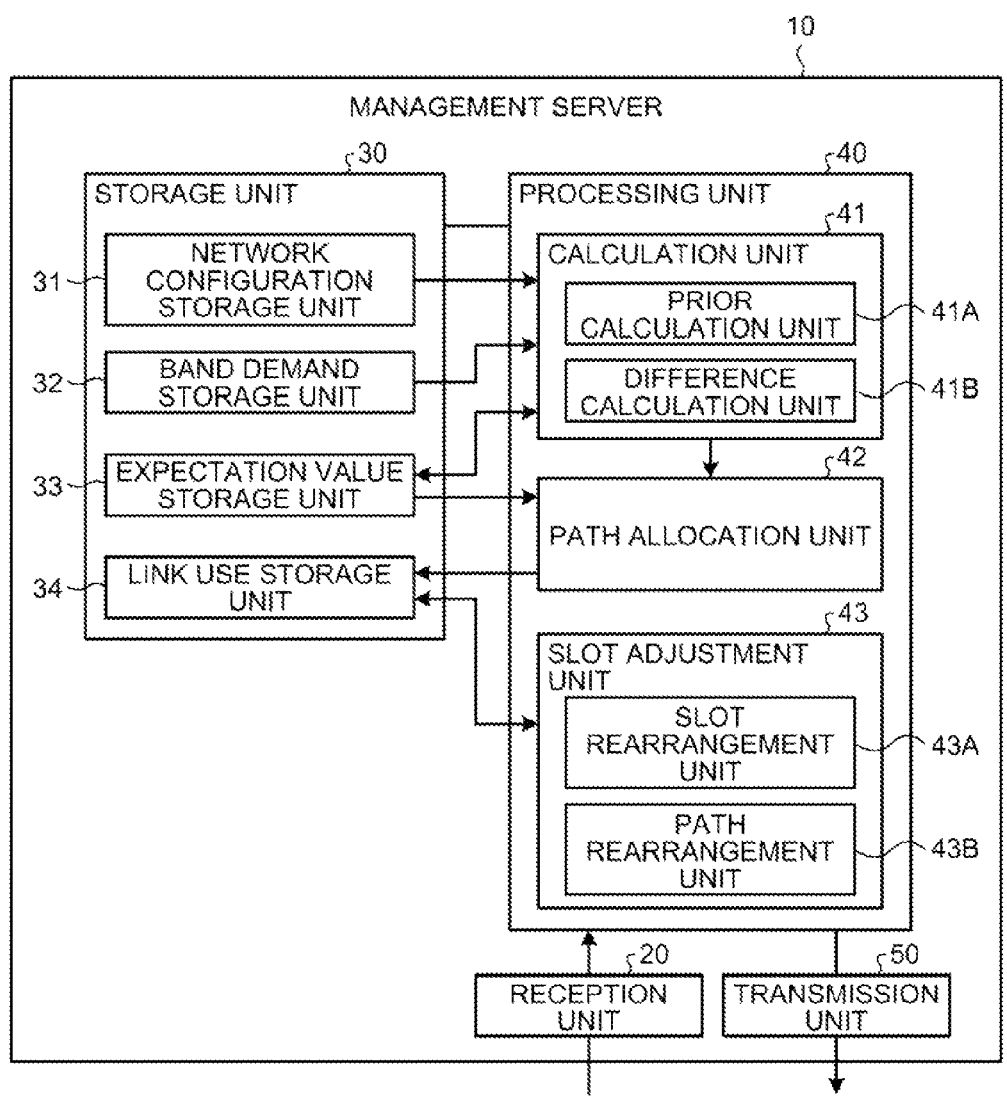
FIG. 7 is a diagram for explaining a configuration of a management server according to the second embodiment.

Next, a configuration of the management server according to the second embodiment will be described. FIG. 7 is a diagram for explaining a configuration of the management server 10 according to the second embodiment. As illustrated in FIG. 7, the management server 10 includes a reception unit 20, a storage unit 30, a processing unit 40, and a transmission unit 50. The management server 10 allocates the path to the slot when a path allocation request is received from the edge node. The reception unit 20 receives a variety of information on path allocation from the edge node or the relay node. For example, the reception unit 20 receives the path allocation request.

The storage unit 30 includes a network configuration storage unit 31, a band demand storage unit 32, an expectation value storage unit 33, and a link use storage unit 34 as illustrated in FIG. 7. The storage unit 30 stores a variety of information input from an administrator or a processing result obtained by a process which will be described later. For example, the storage unit 30 may include a semiconductor memory such as a random access memory (RAM), a read only memory (ROM), and a flash memory or a storage device such as a hard disk (HD) or an optical disk.

The network configuration storage unit 31 stores a configuration of a network managed by itself. FIG. 8 is a diagram for explaining the network configuration storage unit 31. As illustrated in FIG. 8, the network configuration storage unit 31 stores information about the edge node, the relay node, and a link between nodes, which construct the network. For example, the network configuration storage unit 31 stores information representing that the relay node E is connected with the edge node A through a link 1, the edge node C through a link 2, and the relay node F through a link 4, respectively, as illustrated in FIG. 8. Further, the network configuration storage unit 31 stores information representing that the relay node F is connected with the edge node B through a link 6 and the edge node D through a link 7, respectively, as illustrated in FIG. 8. Further, the network configuration storage unit 31 stores information representing that the edge node A is connected with the edge node B through a link 3. Further, the network configuration storage unit 31 stores information representing that the edge node C is connected with the edge node D through a link 5.

Returning back to FIG. 7, the band demand storage unit 32 stores a band set to the link between the edge nodes. For example, the band demand storage unit 32 stores a band from a minimum value that is a previously set minimum transmission rate to a maximum value that is a maximum allowable transmission rate with respect to the link 1 that is a link between the edge node A and the relay node E illustrated in FIG. 8. The expectation value storage unit 33 stores an expectation value computed by the processing unit 40 which will be described later. Specifically, the expectation value storage unit 33 stores an expectation value representing a ratio of the number of allocatable paths to the number of all paths in a case where an arbitrary path is additionally allocated after the path is allocated to each slot.

The link use storage unit 34 stores the total number of use times of each link. FIG. 9 is a diagram for explaining the link use storage unit 34. As illustrated in FIG. 9, the link use storage unit 34 stores a link use table in which a slot is associated with a link frequency for each link. Here, the "link" means a connection between nodes included in the network managed by the management server 10. Further, the "slot" means a time slot, generated in a pseudo manner, on one frame. Further, the "link frequency" means the number of use times of each link.

For example, as illustrated in FIG. 9, the link use storage unit 34 stores "link:1" in association with "the slot #1:1, the slot #2:0, the slot #3:0, the slot#4:1, the slot #5:0, the link frequency:2". That is, the information represents that the "link 1" is used in the "slot #1" and the "slot #4", and the "link frequency" is "twice". Similarly, as illustrated in FIG. 9, the link use storage unit 34 stores "link 2" to "link 7" in association with each "slot" and the "link frequency".

Returning back to FIG. 7, the processing unit 40 includes a calculation unit 41, a path allocation unit 42, and a slot adjustment unit 43. The processing unit 40 executes a variety of processing related to path allocation. For example, the processing unit 40 may include an integrated circuit (IC) such as an application specific integrated circuit (ASIC) and a field programmable gate array (FPGA), or an electronic circuit such as a central processing unit (CPU) or a micro processing unit (MPU).

As illustrated in FIG. 7, the calculation unit 41 includes a prior calculation unit 41A and a difference calculation unit 41B. The prior calculation unit 41A executes various calculation processes for optimizing allocation of the path to the slot. Specifically, the prior calculation unit 41A selects a path having a minimum load as a path from a transmission source node to a transmission destination node by using the network configuration stored in the network configuration storage unit 31 and the band set to each link stored in the band demand storage unit 32. That is, the prior calculation unit 41A forms a path in which links with a minimum load on the network are combined based on the minimum value set to each link.

Further, the prior calculation unit 41A calculates a ratio of the number of allocatable paths to the number of all paths in a case where an arbitrary path is additionally allocated after the path is allocated to each slot, and stores the calculated value in the expectation value storage unit 33 as the expectation value. When an arbitrary path is allocated by using the expectation value stored in the expectation value storage unit 33, the difference calculation unit 41B calculates the expectation value that varies according to the allocation and updates to the calculated expectation value.

The path allocation unit 42 allocates the path formed by combining a link between nodes to any one of a plurality of slots. Specifically, the path allocation unit 42 allocates the path formed by the prior calculation unit 41A to a plurality of slots so that links used in the same slot do not overlap. Further, when the path allocation request is received by the reception unit 20, the path allocation unit 42 forms the path, based on the expectation value stored in the expectation value storage unit 33, so that the number of allocatable paths becomes maximum, and allocates the formed path to the slot.

The slot adjustment unit 43 includes a slot rearrangement unit 43A and a path rearrangement unit 43B as illustrated in FIG. 7. The slot rearrangement unit 43A rearranges the slots so that a plurality of slots to which the path is allocated by the path allocation unit 42 may be consecutively arranged. Specifically, the slot rearrangement unit 43A rearranges the slots so that the same links included respectively in the different paths may be continuously arranged.

Further, the slot rearrangement unit 43A specifies a link having the minimum number of use times among the links included in the paths allocated to a plurality of slots and rearranges the path including the specified link to be continuous from the top of the slot order of a plurality of slots. FIG. 10 is a diagram for explaining the slot rearrangement unit 43A and the path rearrangement unit 43B.

FIG. 10 illustrates "after path allocation" that is a state after paths are allocated to five slots in one frame, "after slot rearrangement" that is a state after the slots to which the path is allocated are rearranged, and "after path rearrangement" that is a state after the path is rearranged. Further, the network configuration illustrated in FIG. 10 is one illustrated in FIG. 8 and is the same in position relationship of each node as in FIG. 8. In FIG. 10, a link indicated by a thick line or a dotted line between nodes means a link that is being used.

As illustrated in "after path allocation" of FIG. 10, a path from the edge node 300A to the edge node 300B using the "link 3" is allocated to the "slot #1". Further, a path from the edge node 300D to the edge node 300A using the "link 5", the "link 2", and the "link 1" is allocated to the "slot #1." Further, a path from the edge node B to the edge node C using the "link 6", the "link 4", and the "link 2" is allocated to the "slot #2". Further, a path from the edge node 300C to the edge node 300D using the "link 5" is allocated to the "slot #2". Further, a path from the edge node 300A to the edge node 300C using the "link 1" and the "link 2" is allocated to the "slot #4".

When the path is allocated by the path allocation unit 42 in the state illustrated in "after path allocation" of FIG. 10, the slot rearrangement unit 43A rearranges the slots so that the "slot #1", the "slot #2", and the "slot #4" to which the path is allocated are consecutively arranged. That is, as illustrated in "after slot rearrangement" of FIG. 10, the slot rearrangement unit 43A rearranges the slot to which the path from the edge node 300A to the edge node 300C using the "link 1" and the "link 2" is allocated as the "slot #3".

Here, the slot rearrangement unit 43A rearranges the slots so that the "link 1", the "link 2", and the "link 5" that are the same links included respectively in the different paths may be continuously arranged as illustrated in "after slot rearrangement" of FIG. 10. Further, the slot rearrangement unit 43A specifies a link having the minimum number of use times among the links included in the paths by referring to the link use table stored in the link use storage unit 34. The slot rearrangement unit 43A rearranges the path including the specified link to be continuous from the top of the slot order of a plurality of slots.

For example, the slot rearrangement unit 43A specifies the "link 6" having the link frequency of "1" by referring to the link use table illustrated in FIG. 9 and rearranges the slots so that the path including the "link 6" is allocated to the "slot #1" as illustrated in "after slot rearrangement" of FIG. 10.

The path rearrangement unit 43B converts a path allocated to any one slot of the slots rearranged by the slot rearrangement unit 43A to a path formed by combining a link included in a path allocated to the slot different from the arranged slot. Specifically, with respect to the paths allocated to the slot, the path rearrangement unit 43B determines whether or not a path may be formed by combining a link included in a path different from the arranged path. If it is determined that the path may be formed, the path rearrangement unit 43B converts the path to the path that may be formed and deletes the link included only in the path to be converted before conversion from the slot Further, with respect to the paths allocated to the slot, when a plurality of paths that may be formed by combining the link included in the path different from the arranged path is present, the path rearrangement unit 43B converts the arranged path to a path having the minimum number of links among the plurality of paths. Further, when a plurality of paths having the minimum number of links are present, the path rearrangement unit 43B calculates the total number of use times of the link for each of the plurality of paths by referring to the number of use times of the link included in each of the plurality of paths and converts the arranged path to a path that is maximum in the calculated total number of use times.

For example, the path rearrangement unit 43B converts a path including the "link 6" among paths allocated to the "slot #1" to a path formed by combining the link included in a path allocated to another slot. That is, the path rearrangement unit 43B converts the path including the "link 6" allocated to the "slot #1" to a path formed by combining the "link 3", the "link 1", and the "link 2" as illustrated by a solid line in "after path rearrangement" of FIG. 10.

Figure 11:
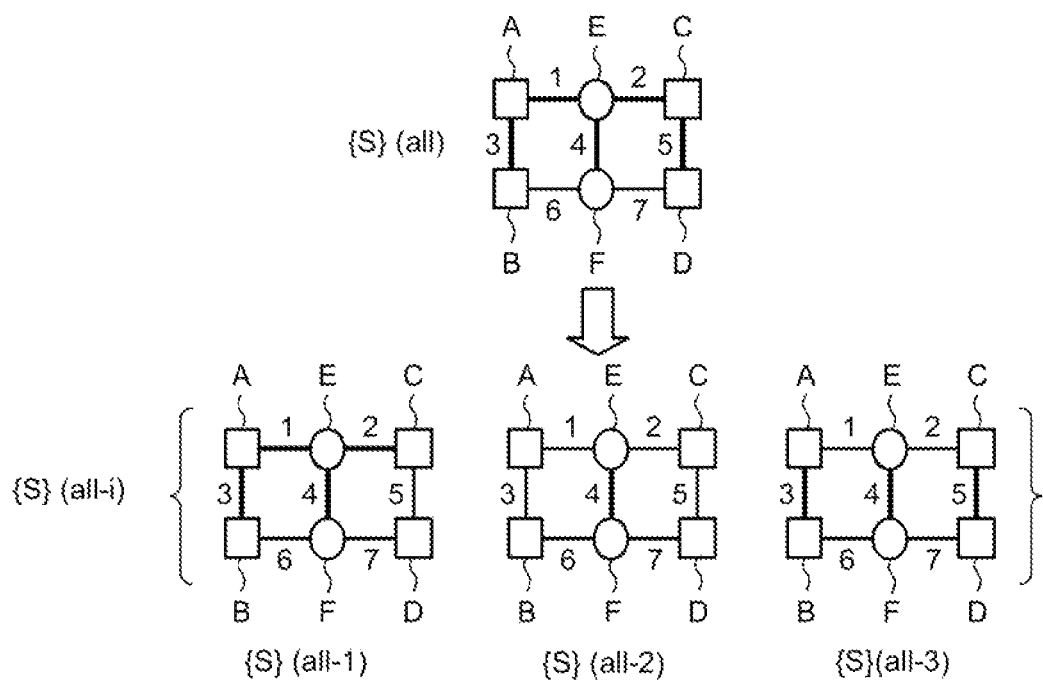
FIG. 11 is a diagram for explaining the details of a process performed by a path rearrangement unit.

Here, the process performed by the path rearrangement unit 43B will be described in detail with reference to FIG. 11. FIG. 11 is a diagram for explaining the details of a process performed by the path rearrangement unit 43B. FIG. 11 illustrates the details of the process from "after slot rearrangement" of FIG. 10 to "after path rearrangement" of FIG. 10 that is performed by the path rearrangement unit 43B. {S} (all) illustrated in FIG. 11 means a set of links excluding a link that is a deletion target from all links used in the path. Further, {S} (all-i) means a set of link excluding a link used by an "i"-th slot from {S} (all). Here, when the path including the link as the deletion target is allocated to the "i"-th slot, the link that forms the path is not excluded. Further, in FIG. 11, a link indicated by a thick line between nodes means a link that is being used.

For example, the path rearrangement unit 43B extracts a set of links excluding the "link 6" as the deletion target from all links used in the path as illustrated in {S} (all) of FIG. 11. That is, the path rearrangement unit 43B extracts {S} (all) in which the used links are "link 1" to "link 5". The path rearrangement unit 43B excludes the links used in the paths allocated to the slot #1, the slot #2, or the slot #3 from {S} (all) as illustrated in {S} (all-i) of FIG. 11, respectively. That is, the path rearrangement unit 43B excludes the "link 5" used in the slot #1 from {S} (all) as illustrated in {S} (all-1) of FIG. 11. Here, the path rearrangement unit 43B does not exclude the "link 4" and the "link 2" included in the path including the "link 6" allocated to the slot #1.

Further, the path rearrangement unit 43B excludes the "link 1", the "link 2", the "link 3", and the "link 5" used in the slot #2 from {S} (all) as illustrated in {S} (all-2) of FIG. 11. Further, the path rearrangement unit 43B excludes the "link 1" and the "link 2" used in the slot #3 from {S} (all) as illustrated in {S}(all-3) of FIG. 11.

The path rearrangement unit 43B determines whether or not a path from the edge node 300B as the transmission source node of the path including the "link 6" to the edge node 300C as the transmission destination node may be formed by any one of {S} (all-i). Here, the path rearrangement unit 43B determines whether or not a path may be formed with the number of hops, which is the number of nodes passed until arriving at the edge node 300C, less than an arbitrary number. Specifically, the path rearrangement unit 43B determines whether or not a path may be formed within "the minimum number of hops from the transmission source node to the transmission destination node+the maximum exceeding number of hops that is arbitrarily set."

For example, the path rearrangement unit 43B determines that the path from the edge node 300B to the edge node 300C may be formed with "the number of hops:3" by using the "link 3", the "link 1", and the "link 2" in {S} (all-1) illustrated in FIG. 11. Further, the path rearrangement unit 43B determines that the path may not be formed in {S} (all-2) and {S}(all-3) illustrated in FIG. 11. The path rearrangement unit 43B converts the path including the "link 6" to a path formed by the "link 3", the "link 1", and the "link 2". That is, the path rearrangement unit 43B allocates a path from the edge node 300B to the edge node 300C via the edge node 300A and the relay node 300E to the slot #1 as illustrated in the "slot #1" of "after path rearrangement" of FIG. 10. The path rearrangement unit 43B deletes the "link 6" and the "link 4" from the "slot #1."

Here, if a plurality of paths from the edge node 300B to the edge node 300C may be formed in {S} (all-i), the path rearrangement unit 43B converts the arranged path to a path having a minimum number of hops among the plurality of paths. Further, if a plurality of paths having the minimum number of hops are present, the path rearrangement unit 43B converts the arranged path to the path that is maximum in the number of use times of the links used in each path.

Figure 12:
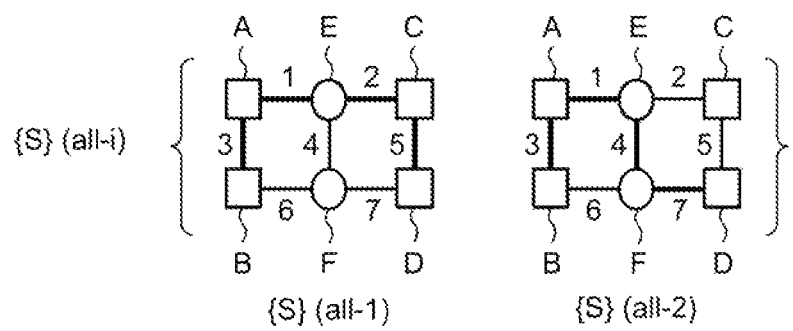
FIG. 12 is a diagram for explaining a process when the number of hops is the same.

FIG. 12 is a diagram for explaining the process when the number of hops is the same. FIG. 12 illustrates {S} (all-i) that is the state after the link used in the path allocated to the slot is excluded from {S} (all). For example, when it is determined whether or not a path from the edge node B to the edge node D may be formed, if a plurality of paths may be formed in {S} (all-i) as illustrated in FIG. 12, the path rearrangement unit 43B executes the following process.

The path rearrangement unit 43B extracts a link frequency of each of the "link 3", the "link 1", the "link 2", and the "link 5" used in the path illustrated in {S}(all-1) of FIG. 12 by referring to the link use table stored in the link use storage unit 34. The path rearrangement unit 43B calculates a total value of the extracted link frequencies. Similarly, the path rearrangement unit 43B extracts the link frequency of each of the "link 3", the "link 1", the "link 4", and the "link 7" used in the path illustrated in {S} (all-2) of FIG. 12 and calculates a total value of the link frequencies. The path rearrangement unit 43B compares the total value calculated from {S} (all-1) with the total value calculated from {S} (all-2) and converts the arranged path to a path having the larger total value.

Further, if the path until arriving at the transmission destination node may not be formed less than the arbitrary number of hops in any of {S} (all-i), the path rearrangement unit 43B converts the arranged path to a path having the minimum number of hops in the path including all links. For example, the path rearrangement unit 43B derives the shortest path through the Dijkstra calculation and converts the arranged path to the derived path.

Returning back to FIG. 7, the transmission unit 50 transmits information about the path obtained by conversion performed by the path rearrangement unit 43B. For example, the transmission unit 50 transmits information about the path allocated to the slot to the node that transmitted the path allocation request.

Here, the change of the link used in the slot rearrangement process and the path rearrangement process illustrated in FIG. 10 will be described with reference to FIG. 13. FIG. 13 is a diagram for explaining an example of a slot adjustment process performed by the management server 10 according to the second embodiment. FIG. 13 illustrates a change of the state of the link use table stored in the link use storage unit 34 by the slot adjustment process. "After path allocation", "after slot rearrangement", and "after path rearrangement" illustrated in FIG. 13 are the link use table corresponding to "after path allocation", "after slot rearrangement", and "after path rearrangement" illustrated in FIG. 10, respectively.

As illustrated in FIG. 13, the link use storage unit 34 stores information representing that "the link:1" is used "twice" in the "slot #1" and the "slot #4" after path allocation by the path allocation unit 42. Further, the link use storage unit 34 stores information representing that "the link:2" is used "three times" in the "slot #1", the "slot #2", and the "slot #4". Further, the link use storage unit 34 stores information representing that "the link:3" is used "once" in the "slot #1". Further, the link use storage unit 34 stores information representing that "the link:4" is used "once" in the "slot #2". Further, the link use storage unit 34 stores information representing that "the link:5" is used "twice" in the "slot #1" and the "slot #2". Further, the link use storage unit 34 stores information representing that "the link:6" is used "once" in the "slot #2". Further, the link use storage unit 34 stores information representing that "the link:7" is not used in any slot.

The slot rearrangement unit 43A rearranges arranged slots so that the same links included respectively in different paths may be continuously rearranged and rearranges a path including the minimum number of use times at the top of the slot order by referring to the link use table. That is, in "after slot rearrangement" of FIG. 13, the link use storage unit 34 stores information representing that "the link:1" is used "twice" in the "slot #2" and the "slot #3". Further, the link use storage unit 34 stores information representing that "the link:2" is used "three times" in the "slot #1", the "slot #2", and the "slot #3". Further, the link use storage unit 34 stores information representing that "the link:3" is used "once" in the "slot #2". Further, the link use storage unit 34 stores information representing that "the link:4" is used "once" in the "slot #1". Further, the link use storage unit 34 stores information representing that "the link:5" is used "twice" in the "slot #1" and the "slot #2". Further, the link use storage unit 34 stores information representing that "the link:6" is used "once" in the "slot #1". Further, the link use storage unit 34 stores information representing that "the link:7" is not used in any slot.

Then, the path rearrangement unit 43B specifies the "link 6" having the minimum number of use times indicated by a thick frame of "after slot rearrangement" of FIG. 13 by referring to the link use table. The path rearrangement unit 43B executes the path rearrangement process of converting the path including the specified "link 6" to a path formed by combining a link included in another path.

That is, in "after path rearrangement" of FIG. 13, the link use storage unit 34 stores information representing that "the link:1" is used "three times" in the "slot #1", the "slot #2", and the "slot #3". Further, the link use storage unit 34 stores information representing that "the link:2" is used "three times" in the "slot #1", the "slot #2", and the "slot #3". Further, the link use storage unit 34 stores information representing that "the link:3" is used "twice" in the "slot #1" and the "slot #2". Further, the link use storage unit 34 stores information representing that "the link:4" is not used in any slot. Further, the link use storage unit 34 stores information representing that "the link: 5" is used "twice" in the "slot #1" and the "slot #2". Further, the link use storage unit 34 stores information representing that "the link:6" is not used in any slot. Further, the link use storage unit 34 stores information representing that "the link:7" is not used in any slot.

Thus, after the path rearrangement process performed by the path rearrangement unit 43B, as indicated by the thick frame of "after path rearrangement" of FIG. 13, the "link 1" and the "link 2" may be in a dormant state in the "slot #4" and the "slot #5". Further, after the path rearrangement process, the "link 3" and the "link 5" may be in a dormant state in the "slot #3" to the "slot #5". Further, after the path rearrangement process, the "link 4", the "link 6", and the "link 7" may be in a dormant state in the "slot #1" to the "slot #5". That is, transition between the operation state and the dormant state in one frame in each link is performed once or less, so that power consumption required in the transition may be reduced.

Next, a procedure of the process performed by the management server according to the second embodiment will be described. A procedure of the process performed by the communication system employing the management server according to the second embodiment will be first described, and thereafter a procedure of the process performed by the management server according to the second embodiment will be described.

A procedure of a pre-operation process performed by the communication system employing the management server according to the second embodiment will be explained below.

Figure 14:
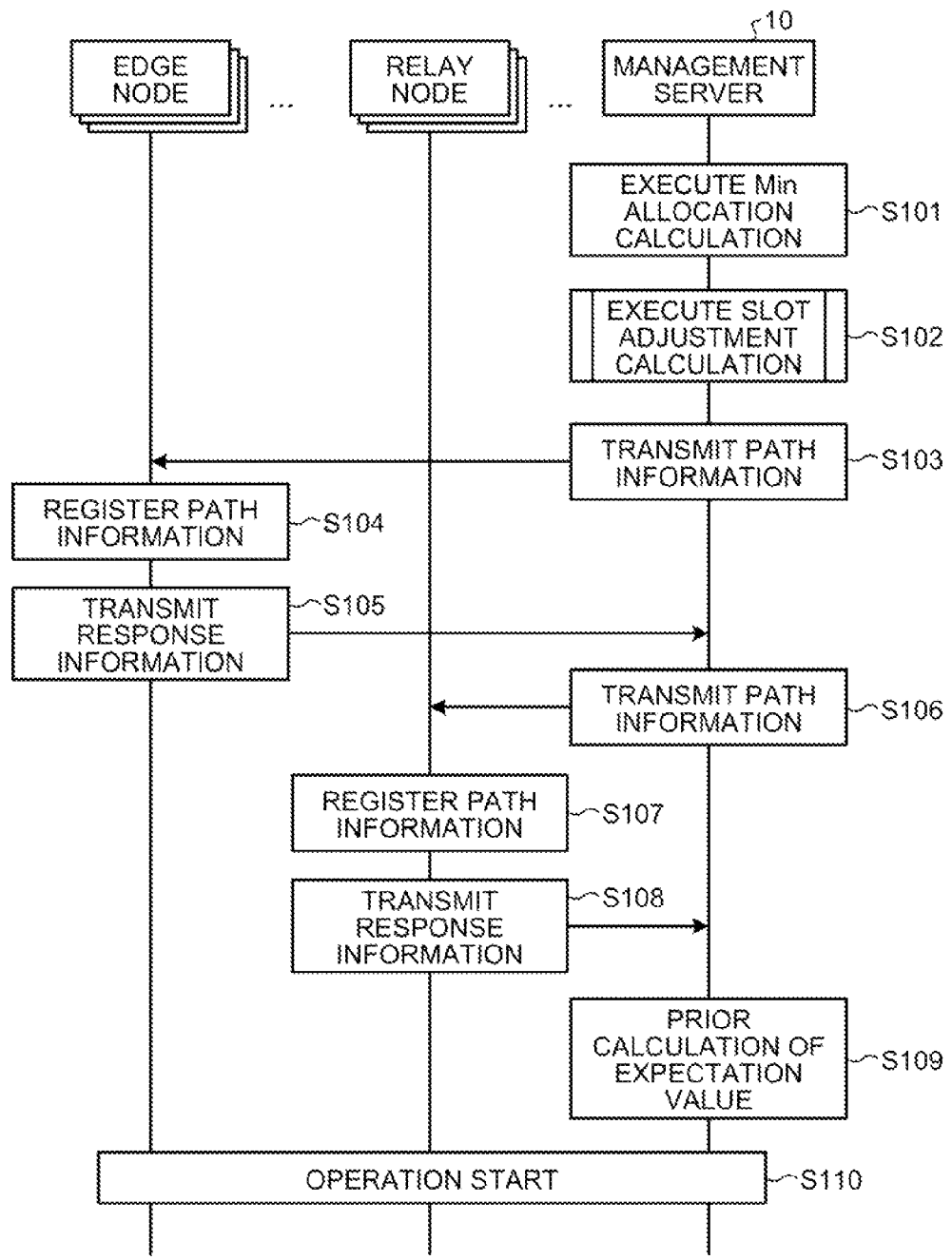
FIG. 14 is a sequence diagram for explaining a procedure of a pre-operation process performed by a communication system employing a management server according to the second embodiment.

FIG. 14 is a sequence diagram for explaining a procedure of a pre-operation process performed by the communication system employing the management server 10 according to the second embodiment. As illustrated in FIG. 14, before an operation of the communication system employing the management server 10, in step S101, the management server 10 executes a Min allocation calculation. Specifically, the prior calculation unit 41A selects a path having a minimum load as a path from the transmission source node to the transmission destination node by using the configuration of the network stored in the network configuration storage unit 31 and the band set to each link stored in the band demand storage unit 32.

In step S102, the slot adjustment unit 43 executes a slot adjustment calculation on the slot to which the path is allocated by the path allocation unit 42. Specifically, the slot rearrangement unit 43A executes the slot rearrangement process, and thereafter the path rearrangement unit 43B executes the path rearrangement process. In step S103, the transmission unit 50 transmits information about a path obtained by conversion performed by the path rearrangement unit 43B to the edge node.

In step S104, the edge node that received the information about the path registers the received path information. In step S105, the edge node transmits response information representing that registration of the received path information was completed to the management server 10. In step S106, the transmission unit 50 also transmits information about a path obtained by conversion performed by the path rearrangement unit 43B to the relay node. In step S107, the relay node that received the information about the path registers the received path information. In step S108, the relay node transmits response information representing that registration of the received path information was completed to the management server 10. Here, the process of transmitting the path information from the management server 10 to the edge node or the relay node is executed repetitively as many times as the number of paths to register.

Then, when the management server 10 completes reception of the response information from the edge node or the relay node, the prior calculation unit 41A performs prior calculation on the expectation value in step S109. In step S110, the edge node, the relay node, and the management server 10 start their operations.

A procedure of an in-operation process performed by the communication system employing the management server according to the second embodiment will be explained below.

Figure 15:
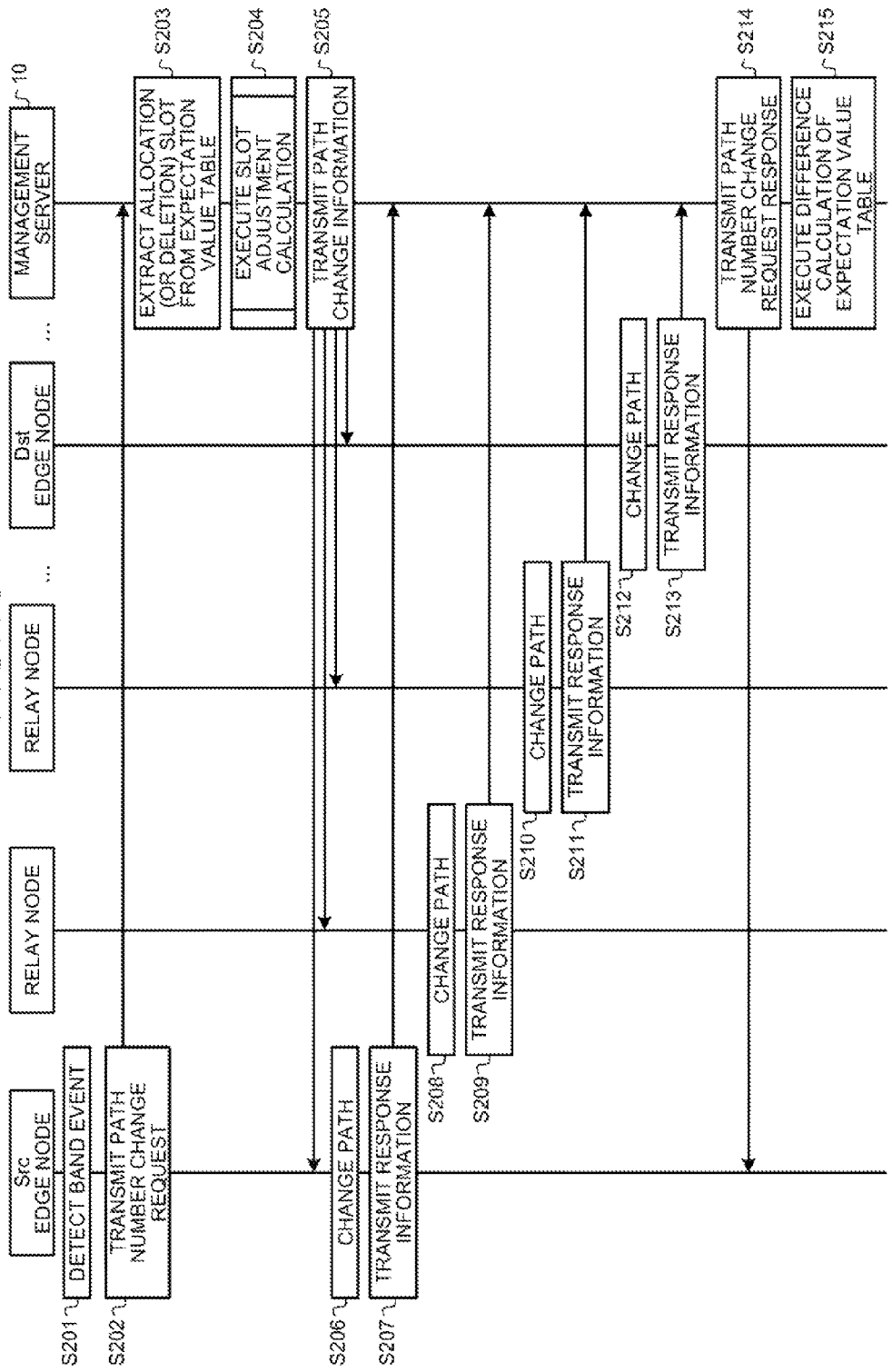
FIG. 15 is a sequence diagram for explaining a procedure of an in-operation process performed by a communication system employing a management server according to the second embodiment.

FIG. 15 is a sequence diagram for explaining a procedure of an in-operation process performed by the communication system employing the management server 10 according to the second embodiment. As illustrated in FIG. 15, during an operation of the communication system employing the management server 10, in step S201, an Src edge node that is a transmission source edge node detects a band event. In step S202, the Src edge node transmits a path number change request to the management server 10. For example, in order to increase or decrease the number of paths according to an increase or decrease in amount of traffic transmitted by the Src edge node, the Src edge node transmits the path number change request to the management server 10.

In step S203, the management server 10 that received the path number change request extracts the slot which the path is allocated to or deleted from, from the expectation value table stored in the expectation value storage unit 33. In step S204, the slot adjustment unit 43 executes the slot adjustment calculation. Thereafter, in step S205, the transmission unit 50 transmits path change information that is information for changing a path to the Src edge node, the relay node, and a Dst node that is a transmission destination edge node.

In step S206, the Src edge node that received the path change information changes the path. In step S207, the Src edge node transmits response information that is information representing that the path change was completed to the management server 10. In step S208 or step S210, the relay node that received the path change information changes the path. In step S209 or step S211, the relay node transmits response information that is information representing that the path change was completed to the management server 10. In step S212, the Dst edge node that received the path change information changes the path. In step S213, the Dst edge node transmits response information that is information representing that the path change was completed to the management server 10. Further, transmission of the path change information to each node and transmission of the response information from each node to the management server are independently executed, respectively.

Then, when the management server 10 completes reception of the response information from the Src edge node, the relay node, and the Dst node, in step S214, the transmission unit 50 transmits a path number change request response that is information representing that the requested path number change was completed to the Src edge node. Thereafter, in step S215, the difference calculation unit 41B executes a difference calculation of the expectation value table stored in the expectation value storage unit 33.

A procedure of a slot adjustment calculation process performed by the management server according to the second embodiment will be explained below.

Figure 16:
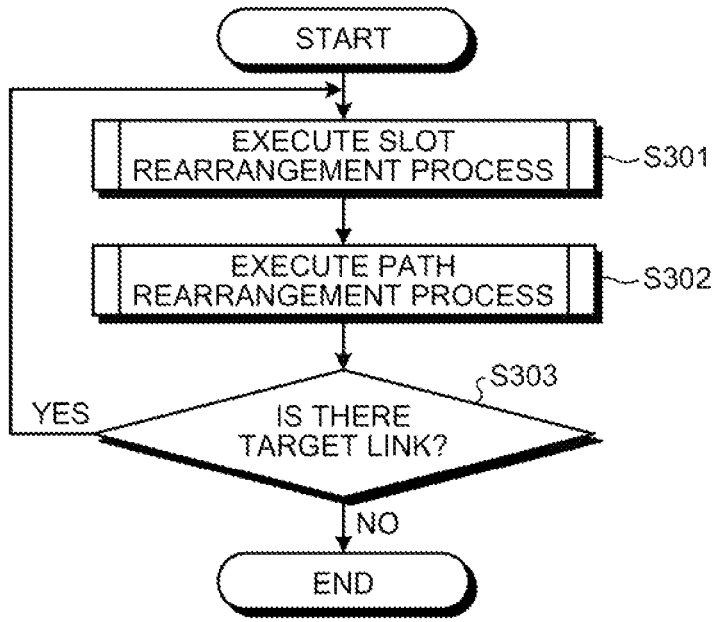
FIG. 16 is a diagram for explaining a procedure of a slot adjustment calculation process performed by a management server according to the second embodiment.

FIG. 16 is a diagram for explaining a procedure of a slot adjustment operation process performed by the management server according to the second embodiment. As illustrated in FIG. 16, in step S301, the slot rearrangement unit 43A executes the slot rearrangement process. In step S302, the path rearrangement unit 43B executes the path rearrangement process. In step S303, the management server 10 determines whether or not there is a link as a deletion target.

Specifically, before executing the slot rearrangement process in step S301, it is determined whether or not there is a link that has the number of use times equal to or less than the number of use times of the link as the deletion target. Here, when it is determined that there is a link as the deletion target (Yes in step S303), the slot rearrangement unit 43A returns to step S301 and executes the slot rearrangement process. On the other hand, when it is determined that there is no link as the deletion target (No in step S303), the management server 10 ends the process.

A procedure of the slot rearrangement process performed by the management server according to the second embodiment will be explained below.

Figure 17:
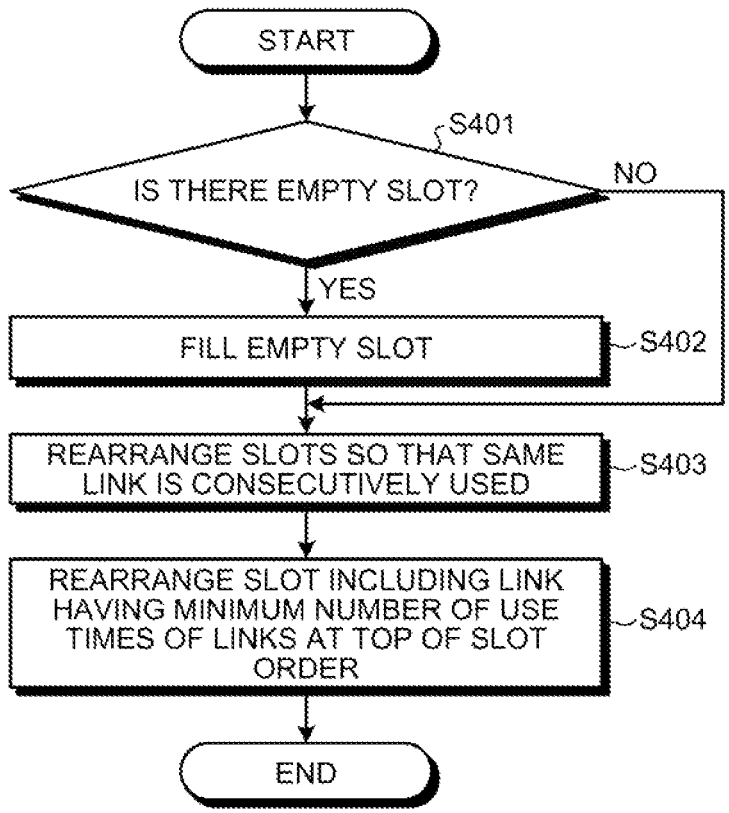
FIG. 17 is a diagram for explaining a procedure of a slot rearrangement process performed by a management server according to the second embodiment.

FIG. 17 is a diagram for explaining a procedure of the slot rearrangement process performed by the management server 10 according to the second embodiment. As illustrated in FIG. 17, in step S401, the slot rearrangement unit 43A determines whether or not there is an empty slot. Specifically, the slot rearrangement unit 43A determines whether or not slots to which paths are allocated by the path allocation unit 42 are continuously arranged.

Here, when it is determined that there is an empty slot (Yes in step S401), in step S402, the slot rearrangement unit 43A fills the empty slot and consecutively rearranges slots to which paths are allocated. In step S403, the slot rearrangement unit 43A rearranges the slots so that the same links used in different slots may be consecutively used. Further, when it is determined that there is no empty slot (No in step S401), the slot rearrangement unit 43A executes the process of step S403.

Thereafter, in step S404, the slot rearrangement unit 43A rearranges the slot including a minimum number of use times of the link at the top of the slot order based on the link use table stored in the link use storage unit 34 and ends the process.

A procedure of the path rearrangement process performed by the management server according to the second embodiment will be explained below.

Figure 18:
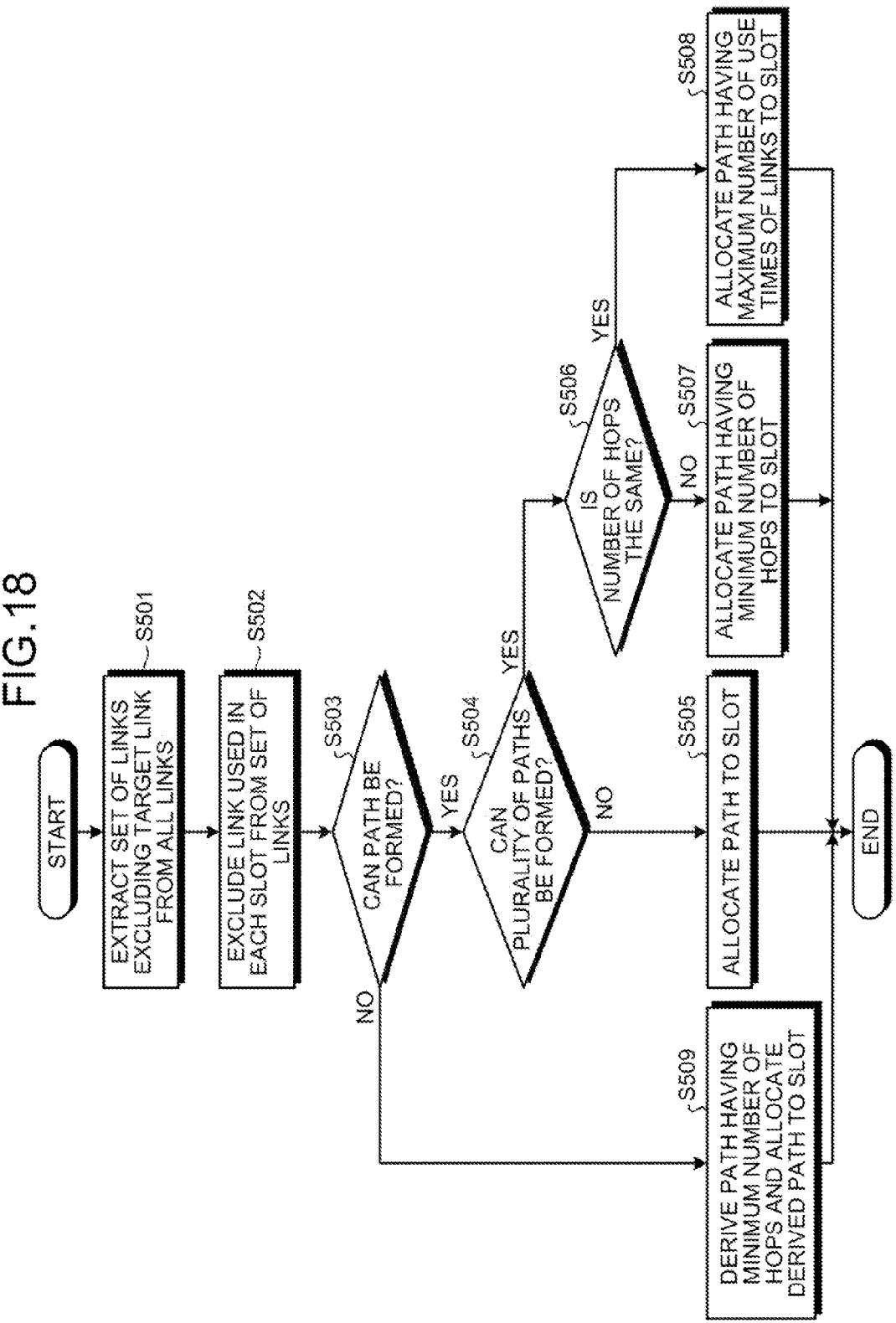
FIG. 18 is a diagram for explaining a procedure of a path rearrangement process performed by a management server according to the second embodiment.

FIG. 18 is a diagram for explaining a procedure of the path rearrangement process performed by the management server 10 according to the second embodiment. As illustrated in FIG. 18, in step S501, the path rearrangement unit 43B extracts a set of links excluding a link as a deletion target from all links used in the paths allocated to the slots.

In step S502, the path rearrangement unit 43B excludes the link used in each slot from the extracted set of the links. Here, the path rearrangement unit 43B does not exclude a link included in a path including the link as the deletion target. In step S503, the path rearrangement unit 43B determines whether or not a path that replaces the path including the link as the deletion target may be formed in the set of the links excluding the link used in each slot. Specifically, it is determined whether or not a path from the transmission source node of the path including the link as the deletion target to the transmission destination node may be formed in the set of links excluding the link used in each slot.

Here, when it is determined that the path may be formed (Yes in step S503), in step S504, the path rearrangement unit 43B determines whether or not a plurality of paths may be formed. Here, when the plurality of paths may not be formed (No in step S504), in step S505, the path rearrangement unit 43B allocates the path that may be formed to the slot and ends the process. However, when the plurality of paths may be formed (Yes in step S504), in step S506, the path rearrangement unit 43B determines whether or not the paths that may be formed are the same in the number of hops.

Here, when the number of hops is not the same (No in step S506), in step S507, the path rearrangement unit 43B allocates a path having a minimum number of hops to the slot and ends the process. On the other hand, when it is determined that the number of hops is the same (Yes in step S506), in step S508, the path rearrangement unit 43B allocates a path, which is maximum in the number of use times of the links included in the paths that may be formed, to the slot and ends the process.

Meanwhile, when it is determined in step S503 that the path may not be formed (No in step S503), in step S509, the path rearrangement unit 43B derives a path having the minimum number of hops, allocates the derived path to the slot, and ends the process. Specifically, the path rearrangement unit 43B executes the shortest path calculation process that uses all links to derive a path having the minimum number of hops and allocates the derived path to the slot.

As described above, according to the second embodiment, the path allocation unit 42 allocates a path formed by combining a link between nodes to any one of a plurality of slots. The slot rearrangement unit 43A rearranges a plurality of slots so that the slots to which the path is allocated by the path allocation unit 42 may be consecutively arranged. The path rearrangement unit 43B converts the path allocated to any one of the slots rearranged by the slot rearrangement unit 43A to a path formed by combining the link included in a path allocated to a slot different from the arranged slot. Further, the transmission unit 50 transmits information about the path obtained by conversion performed by the path rearrangement unit 43B. Therefore, the management server 10 according to the second embodiment may suppress transition between an operation state and a dormant state by continuously maintaining the operation state of the node of the network, thereby reducing power consumption.

Further, according to the second embodiment, the slot rearrangement unit 43A rearranges a plurality of slots so that the same links included respectively in different paths may be continuously arranged. Therefore, the management server 10 according to the second embodiment may continuously maintain the operation state of the links to be used.

Further, according to the second embodiment, the slot rearrangement unit 43A specifies a link having a minimum number of use times among links included in paths allocated to a plurality of slots and rearranges a path including the specified link to be continuous from the top of the slot order of a plurality of slots. Therefore, the management server 10 according to the second embodiment may continuously maintain the operation state of the link that is the deletion target.

Further, according to the second embodiment, with respect to the paths allocated to the slot, the path rearrangement unit 43B determines whether or not a path may be formed by combining a link included in a path different from the arranged path. If it is determined that the path may be formed, the path rearrangement unit 43B converts the arranged path to the path formed by combining the link and deletes a link included only in the path before conversion from the slot. Therefore, the management server 10 according to the second embodiment may make a link that is not used, be in a dormant state.

Further, according to the second embodiment, with respect to a path allocated to a slot, when a plurality of paths may be formed by combining the link included in a path different from the path, the path rearrangement unit 43B converts the arranged path to a path having a minimum number of links among the plurality of paths. Therefore, the management server according to the second embodiment may make minimum the number of links that is to be in an operation state.

Further, according to the second embodiment, when a plurality of paths having a minimum number of links are present, the path rearrangement unit 43B calculates the total number of use times of the links for each of the plurality of paths by referring to the number of use times of the links included in each of the plurality of paths. The path rearrangement unit 43B converts the arranged path to the path that is maximum in the calculated total number of use times. Therefore, the management server according to the second embodiment may change the path to the path formed by combining the link used at the high frequency.

[c] Third Embodiment

The first and second embodiments have been described hereinbefore, but various embodiments different from the first and second embodiments may be made. Different embodiments will be described below in connection with (1) to (3).

(1) A Slot Order

The second embodiment has been described in connection with the case in which slots to which paths are allocated are consecutively rearranged in order starting from the "slot #1". However, the present embodiment is not limited thereto. For example, a rearrangement of a reverse order starting from the slot #5 may be made.

(2) A System Configuration, Etc.

Each component of each device illustrated in the drawings is conceptional and need not to be necessarily the same as a physically illustrated component. That is, a specific form of dispersion or integration of each device is not limited to an illustrated one, and all or a part may be functionally or physically dispersed or integrated in an arbitrary unit according to various loads or use environments. For example, the prior calculation unit 41A and the difference calculation unit 41B illustrated in FIG. 7 may be integrated as one calculation unit. Further, the prior calculation unit 41A illustrated in FIG. 7 may be dispersed into an allocation calculation unit that executes the Min allocation calculation and an expectation value calculation unit that calculates the expectation value.

Further, among the processes described in the present embodiment, all or a part of the process described as being automatically performed may be manually performed. For example, the determination on whether or not a plurality of paths may be formed may be manually performed. Further, the processing unit 40 may be connected via the network as an external device of the management server 10. Further, the slot adjustment unit 43 may be disposed in another device and connected to the network to cooperate, so that a function of the management server 10 is implemented. Further, all or a part of each processing function executed in each device may be implemented by a central processing unit (CPU) and a program analyzed and executed by the CPU or may be implemented as hardware configured with a wired logic.

(3) A Communication Management Program

Figure 19:
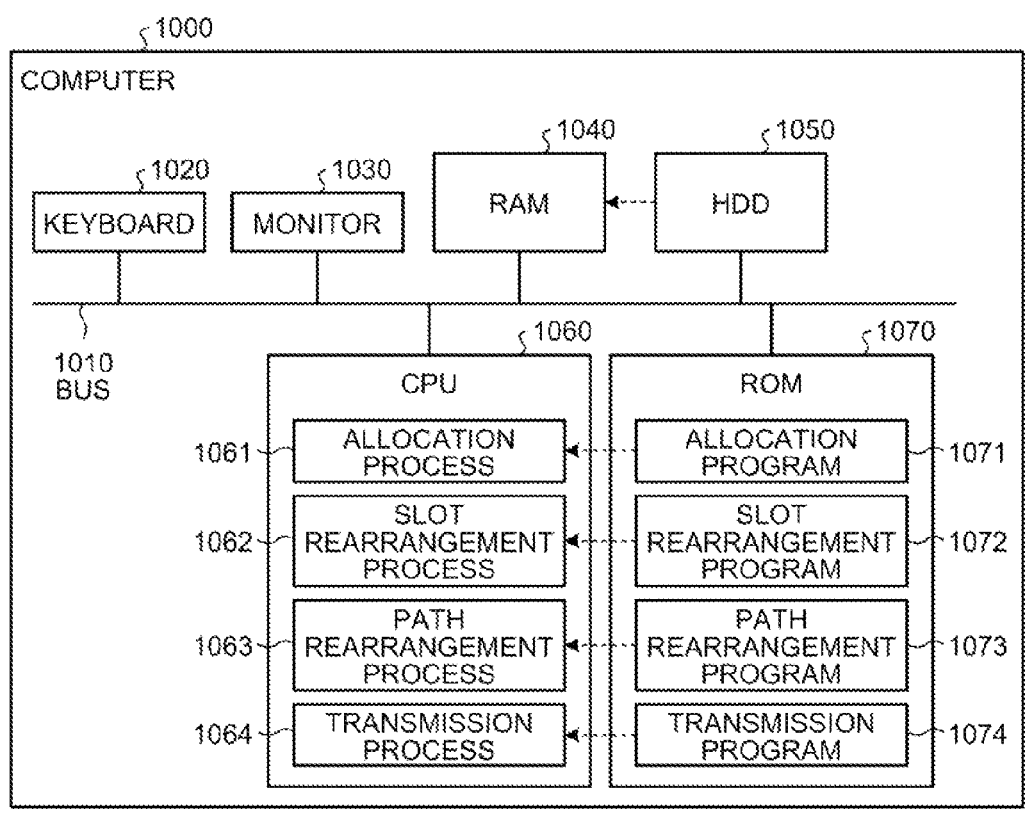
FIG. 19 is a diagram for explaining a computer that executes a communication management program according to a third embodiment.

The first embodiment has been described in connection with the case in which various processing is implemented by a hardware logic. However, the present embodiment is not limited thereto and may be implemented by executing a previously prepared program in a computer. An example of a computer that executes a communication management program having the same function as the communication management apparatus 1 described in the first embodiment will be described below with reference to FIG. 19. FIG. 19 is a diagram for explaining a computer that executes a communication management program according to a third embodiment.

As illustrated in FIG. 19, a computer 1000 as an information processing apparatus includes a keyboard 1020, a monitor 1030, a RAM 1040, a hard disk drive (HDD) 1050, a CPU 1060, and a ROM 1070. The keyboard 1020, the monitor 1030, the RAM 1040, the HDD 1050, the CPU 1060, and the ROM 1070 are connected to each other by a bus 1010.

The ROM 1070 previously stores the communication management program that executes the same function as the communication management apparatus 1 described in the first embodiment, that is, an allocation program 1071 and a slot rearrangement program 1072 as illustrated in FIG. 19. Further, the ROM 1070 previously stores a path rearrangement program 1073 and a transmission program 1074. Further, similarly to each component of the communication management apparatus 1 illustrated in FIG. 1, the programs 1071 to 1074 may be appropriately integrated or dispersed.

The programs 1071 to 1074 are read and executed by the CPU 1060 to function as processes, respectively, as illustrated in FIG. 19. That is, an allocation process 1061, a slot rearrangement process 1062, a path rearrangement process 1063, and a transmission process 1064 are executed to function. The processes 1061 to 1064 correspond to the allocation unit 2, the slot rearrangement unit 3, the path rearrangement unit 4, and the transmission unit 5 illustrated in FIG. 1, respectively.

Further, the programs 1071 to 1074 need not be necessarily initially stored in the ROM 1070. The programs may be stored in any other storage medium or storage device and read and executed by the computer 1000. Any other storage medium or storage device may include a "portable physical medium" such as a flexible disk (FD), a CD-ROM, a MO disk, a DVD disk, an optical disk, and an IC card that are inserted into the computer 1000. Further, any other storage medium or storage device may include a "fixed physical medium" such as a HDD disposed inside or outside the computer 1000. Further, any other storage medium or storage device may include "another computer (or server)" connected to the computer 1000 via a public circuit, the Internet, a local area network (LAN), or a wide area network (WAN).

The disclosed apparatus may reduce power consumption required when starting and stopping the apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication management apparatus, comprising:
an allocation unit that creates in a plurality of time slots allocated time slots by allocating a path or paths, the path or a path of the paths being formed by combining a link or links between nodes to each of the allocated time slots, the paths including a first path, a second path or a third path, the nodes including a first node or a second node;
a slot rearrangement unit that creates rearranged time slots that are the allocated time slots consecutively arranged and wherein a time slot in the rearranged time slots is firstly arranged, the time slot being allocated with the path that includes the link having a minimum number of use times among the links included in the allocated time slots, by rearranging the plurality of time slots;
a path rearrangement unit that converts the first path from the first node to the second node allocated to a first time slot in the rearranged time slots to the second path from the first node to the second node formed by including a link from among the links to the first path, the link from among the links being included in the third path allocated to a second time slot in the rearranged time slots; and
a transmission unit that transmits information about the second path obtained by conversion performed by the path rearrangement unit.

2. The communication management apparatus according to claim 1,
wherein the slot rearrangement unit rearranges the rearranged time slots so that in the rearranged time slots a third time slot and a fourth time slot are consecutively arranged wherein the link included in the path allocated to the third time slot and the link included in the path allocated to the fourth time slot are identical.

3. A communication management apparatus, comprising:
an allocation unit that creates in a plurality of time slots allocated time slots by allocating a path or paths, the path or a path of the paths being formed by combining a link or links between nodes to each of the allocated time slots, the paths including a first path, a second path or a third path, the nodes including a first node or a second node;
a slot rearrangement unit that creates rearranged time slots that are the allocated time slots consecutively arranged by rearranging the plurality of time slots;
a path rearrangement unit that converts the first path from the first node to the second node allocated to a first time slot in the rearranged time slots to the second path from the first node to the second node formed by including the link to the first path, the included link being included in the third path allocated to a second time slot in the rearranged time slots, when determining that in the rearranged time slots the first path can be converted to the second path wherein the second path does not include the link that is included in the first path; and
a transmission unit that transmits information about the second path obtained by conversion performed by the path rearrangement unit.

4. The communication management apparatus according to claim 3,
wherein the path rearrangement unit, when determining that the first path can be converted to a first plurality of paths corresponding to the second path, converts the first path to the path including a minimum number of links from among the links among the first plurality of paths.

5. The communication management apparatus according to claim 4,
wherein the path rearrangement unit, when determining that a second plurality of paths in the first plurality of paths have the minimum number of links, converts the first path to the path among the second plurality of paths, a total of use times of the link included in the path being the largest among the second plurality of paths.

6. A non-transitory computer-readable recording medium that stores therein a computer program causing a computer to execute a process comprising:
creating in a plurality of time slots allocated time slots by allocating a path or paths, the path or a path of the paths being formed by combining a link or links between nodes to each of the allocated time slots, the paths including a first path, a second path or a third path, the nodes including a first node or a second node;
creating rearranged time slots that are the allocated time slots consecutively arranged and wherein a time slot in the rearranged time slots is firstly arranged, the time slot being allocated with the path that includes the link having a minimum number of use times among the links included in the allocated time slots, by rearranging the plurality of time slots;
converting the first path from the first node to the second node allocated to a first time slot in the rearranged time slots to the second path from the first node to the second node formed by including a link from among the links to the first path, the link from among the links being included in the third path allocated to a second time slot in the rearranged time slots; and transmitting information about the second path obtained by conversion performed at the converting.

7. A communication management apparatus, comprising:
a processor; and
a memory, wherein the processor executes a process comprising:
creating in a plurality of time slots allocated time slots by allocating a path or paths, the path or a path of the paths being formed by combining a link or links between nodes to each of the allocated time slots, the paths including a first path, a second path or a third path, the nodes including a first node or a second node;
creating rearranged time slots that are the allocated time slots consecutively arranged and wherein a time slot in the rearranged time slots is firstly arranged, the time slot being allocated with the path that includes the link having a minimum number of use times among the links included in the allocated time slots, by rearranging the plurality of time slots;
converting the first path from the first node to the second node allocated to a first time slot in the rearranged time slots to the second path from the first node to the second node formed by including a link from among the links to the first path, the link from among the links being included in the third path allocated to a second time slot in the rearranged time slots; and
transmitting information about the second path obtained by conversion performed at the converting.

8. A non-transitory computer-readable recording medium that stores therein a computer program causing a computer to execute a process comprising:
creating in a plurality of time slots allocated time slots by allocating a path or paths, the path or a path of the paths being formed by combining a link or links between nodes to each of the allocated time slots, the paths including a first path, a second path or a third path, the nodes including a first node or a second node;
creating rearranged time slots that are the allocated time slots consecutively arranged by rearranging the plurality of time slots;
converting the first path from the first node to the second node allocated to a first time slot in the rearranged time slots to the second path from the first node to the second node formed by including the link to the first path, the included link being included in the third path allocated to a second time slot in the rearranged time slots, when determining that in the rearranged time slots the first path can be converted to the second path wherein the second path does not include the link that is included in the first path; and
transmitting information about the second path obtained by conversion performed at the converting.

9. A communication management apparatus, comprising:
a processor; and
a memory, wherein the processor executes a process comprising:
creating in a plurality of time slots allocated time slots by allocating a path or paths, the path or a path of the paths being formed by combining a link or links between nodes to each of the allocated time slots, the paths including a first path, a second path or a third path, the nodes including a first node or a second node;
creating rearranged time slots that are the allocated time slots consecutively arranged by rearranging the plurality of time slots;
converting the first path from the first node to the second node allocated to a first time slot in the rearranged time slots to the second path from the first node to the second node formed by including the link to the first path, the included link being included in the third path allocated to a second time slot in the rearranged time slots, when determining that in the rearranged time slots the first path can be converted to the second path wherein the second path does not include the link that is included in the first path; and
transmitting information about the second path obtained by conversion performed at the converting.

* * * * *